(12) United States Patent
Schuster et al.

(10) Patent No.: US 6,870,830 B1
(45) Date of Patent: Mar. 22, 2005

(54) SYSTEM AND METHOD FOR PERFORMING MESSAGING SERVICES USING A DATA COMMUNICATIONS CHANNEL IN A DATA NETWORK TELEPHONE SYSTEM

(75) Inventors: Guido M. Schuster, Zurich (CH); Ikhlaq S. Sidhu, Vernon Hills, IL (US); Andrew Bezaitis, Chicago, IL (US); Thomas Gentles, Algonquin, IL (US)

(73) Assignee: 3Com Corporation, Marlborough, MA (US)

( * ) Notice: Subject to any disclaimer, the term of this patent is extended or adjusted under 35 U.S.C. 154(b) by 841 days.

(21) Appl. No.: 09/726,993

(22) Filed: Nov. 30, 2000

(51) Int. Cl.[7] ............................................. H04L 12/66
(52) U.S. Cl. ...................... 370/352; 370/357; 370/389
(58) Field of Search ................................ 370/270, 271, 370/264, 352, 353, 354, 355, 357, 389, 463, 419, 420, 356; 709/230, 246; 379/88.11, 88.13, 88.15, 88.17; 455/412, 413, 414, 466

(56) References Cited

U.S. PATENT DOCUMENTS

| | | | |
|---|---|---|---|
| 3,789,143 A | 1/1974 | Blackmer | 381/106 |
| 4,169,219 A | 9/1979 | Beard | 369/47.25 |
| 4,216,427 A | 8/1980 | Bethards | 455/108 |
| 4,249,042 A | 2/1981 | Orban | 381/106 |
| 4,306,202 A | 12/1981 | Schroder | 333/14 |
| 4,313,035 A | 1/1982 | Jordan et al. | |
| 4,322,579 A | 3/1982 | Kleis et al. | 381/106 |
| 4,368,435 A | 1/1983 | Bloy | 330/133 |
| 4,482,973 A | 11/1984 | Unagami et al. | 327/331 |
| 4,553,257 A | 11/1985 | Mori et al. | 381/107 |
| 4,558,460 A | 12/1985 | Tanaka et al. | 381/86 |
| 4,562,591 A | 12/1985 | Stikvoort | 381/106 |
| 4,628,526 A | 12/1986 | Germer | 381/57 |
| 4,641,361 A | 2/1987 | Rosback | 381/103 |
| 4,853,963 A | 8/1989 | Bloy et al. | 704/225 |
| 4,859,964 A | 8/1989 | Jorgensen | 330/279 |
| 4,868,881 A | 9/1989 | Zwicker et al. | 381/107 |
| 4,882,762 A | 11/1989 | Waldhauer | 381/106 |
| 4,891,837 A | 1/1990 | Walker et al. | 379/390 |
| 4,947,133 A | 8/1990 | Thomas | 327/318 |
| 4,953,221 A | 8/1990 | Holly et al. | 381/108 |
| 4,972,164 A | 11/1990 | Akagiri et al. | 381/106 |
| 5,107,539 A | 4/1992 | Kato et al. | 381/57 |
| 5,172,358 A | 12/1992 | Kimura | 369/47 |
| 5,434,922 A | 7/1995 | Miller et al. | 381/57 |
| 5,444,788 A | 8/1995 | Orban | 381/106 |
| 5,448,623 A | 9/1995 | Wiedeman et al. | |

(List continued on next page.)

FOREIGN PATENT DOCUMENTS

DE    198 13 179 A 1    9/1999

(List continued on next page.)

OTHER PUBLICATIONS

Zellweger, Polle T. et al. *An Overview of the Etherphone System and Its Applications*, Xerox Palo Alto Research Center (Mar. 1988), pps. 160–168, XP 000617541.

(List continued on next page.)

*Primary Examiner*—Wellington Chin
*Assistant Examiner*—Jamal A. Fox
(74) *Attorney, Agent, or Firm*—McDonnell Boehnen Hulbert & Berghoff LLP (57) ABSTRACT

A system and method for performing messaging between telephones in a data network telephone system. The message communications may be managed by a messaging application connected to the data network. The messaging application detects when a telephone is connected to another telephone and sends a messaging input screen to the first telephone. The messaging application may determine the availability of other users for messaging and may control messages communicated between the first telephone and the other users. The messages may be text or voice messages.

13 Claims, 7 Drawing Sheets

U.S. PATENT DOCUMENTS

| | | | |
|---|---|---|---|
| 5,450,494 A | 9/1995 | Okubo et al. | 381/57 |
| 5,463,695 A | 10/1995 | Werrbach | 381/106 |
| 5,471,470 A * | 11/1995 | Sharma et al. | 370/271 |
| 5,509,081 A | 4/1996 | Kuusama | 381/103 |
| 5,530,761 A | 6/1996 | D'Alaver de Costemore | 381/57 |
| 5,550,922 A | 8/1996 | Becker | 381/57 |
| 5,563,937 A | 10/1996 | Bruno et al. | |
| 5,577,041 A * | 11/1996 | Sharma et al. | 370/271 |
| 5,615,270 A | 3/1997 | Miller et al. | 381/57 |
| 5,631,968 A | 5/1997 | Frey et al. | 381/106 |
| 5,646,945 A | 7/1997 | Bergler | |
| 5,666,426 A | 9/1997 | Helms | 381/57 |
| 5,727,057 A | 3/1998 | Emery et al. | 379/211 |
| 5,764,627 A * | 6/1998 | Sharma et al. | 370/271 |
| 5,764,628 A * | 6/1998 | Davis et al. | 370/271 |
| 5,894,473 A | 4/1999 | Dent | |
| 5,918,172 A | 6/1999 | Saunders et al. | 455/404 |
| 5,930,700 A | 7/1999 | Pepper et al. | |
| 5,938,757 A | 8/1999 | Bertsch | |
| 5,960,340 A | 9/1999 | Fuentes | |
| 6,006,272 A | 12/1999 | Aravamudan et al. | |
| 6,075,992 A | 6/2000 | Moon et al. | |
| 6,175,860 B1 | 1/2001 | Gaucher | |
| 6,216,158 B1 | 4/2001 | Luo et al. | |
| 6,240,097 B1 | 5/2001 | Wesolek et al. | |
| 6,411,965 B2 | 6/2002 | Klug | |
| 6,577,622 B1 * | 6/2003 | Schuster et al. | 370/352 |
| 6,731,630 B1 * | 5/2004 | Schuster et al. | 370/356 |
| 6,741,586 B1 * | 5/2004 | Schuster et al. | 370/352 |
| 6,744,759 B1 * | 6/2004 | Sidhu et al. | 370/356 |
| 6,795,429 B1 * | 9/2004 | Schuster et al. | 370/352 |
| 6,804,224 B1 * | 10/2004 | Schuster et al. | 370/352 |

FOREIGN PATENT DOCUMENTS

| | | |
|---|---|---|
| EP | 0 869 688 A2 | 10/1998 |
| WO | WO98/00988 | 1/1998 |
| WO | WO98/10538 | 3/1998 |

OTHER PUBLICATIONS

Terry, Douglas B. et al. *Managing Stored Voice In the Etherphone System*, Xerox Palo Alto Research Center vol. 1, (Feb. 1998), pps. 3–27, XP 000032477.

Terry, Douglas B. et al. *Managing Stored Voice In the Etherphone System*, Operating Systems Review (SIGOPS), US, ACM Head Quarter, New York, NY. vol. 21, No. % (Nov. 8, 1987), pps. 103–107, XP 000005196.

U.S. Appl. No. 09/451,388, filed Nov. 30, 1999, Schuster et al.

U.S. Appl. No. 09/406,231, filed Sep. 27, 1999, Schuster et al.

U.S. Appl. No. 09/515,365, filed Feb. 29, 2000, Schuster et al.

U.S. Appl. No. 09/406,320, filed Sep. 27, 1999, Schuster et al.

U.S. Appl. No. 09/515,797, filed Feb. 29, 2000, Schuster et al.

U.S. Appl. No. 09/515,364, filed Feb. 29, 2000, Schuster et al.

U.S. Appl. No. 09/405,283, filed Sep. 27, 1999, Schuster et al.

U.S. Appl. No. 09/515,798, filed Feb. 29, 2000, Schuster et al.

U.S. Appl. No. 09/584,924, filed May 31, 2000, Schuster et al.

U.S. Appl. No. 09/515,969, filed Feb. 29, 2000, Schuster et al.

U.S. Appl. No. 09/406,322, filed Sep. 27, 1999, Schuster et al.

U.S. Appl. No. 09/406,152, filed Sep 27, 1999, Schuster et al.

U.S. Appl. No. 09/405,981, filed Sep. 27, 1999, Schuster et al.

U.S. Appl. No. 09/406,128, filed Sep. 27, 1999, Schuster et al.

U.S. Appl. No. 09/515,387, filed Feb. 29, 2000, Schuster et al.

U.S. Appl. No. 09/515,970, filed Feb. 29, 2000, Schuster et al.

U.S. Appl. No. 09/515,796, filed Feb. 29, 2000, Schuster et al.

U.S. Appl. No. 09/406,151, filed Sep. 27, 1999, Schuster et al.

U.S. Appl. No. 09/406,298, filed Sep. 27, 1999, Schuster et al.

U.S. Appl. No. 09/406,066, filed Sep. 27, 1999, Schuster et al.

U.S. Appl. No. 09/515,795, filed Feb. 29, 2000, Schuster et al.

U.S. Appl. No. 09/516,269, filed Feb. 29, 2000, Schuster et al.

U.S. Appl. No. 09/515,366, filed Feb. 29, 2000, Schuster et al.

U.S. Appl. No. 09/470,879, filed Dec. 22, 1999, Schuster et al.

U.S. Appl. No. 09/707,708, filed Nov. 7, 2000, Schuster et al.

U.S. Appl. No. 09/677,077, filed Sep. 29, 2000, Schuster et al.

U.S. Appl. No. 09/584,927, filed May 31, 2000, Schuster et al.

U.S. Appl. No. 09/728,833, filed Nov. 30, 2000, Schuster et al.

* cited by examiner

SYSTEM AND METHOD FOR PERFORMING MESSAGING SERVICES USING A DATA COMMUNICATIONS CHANNEL IN A DATA NETWORK TELEPHONE SYSTEM

FIELD OF THE INVENTION

The present invention relates to a system and method for providing communication services over a network. In particular, the present invention relates to a system and method for providing communication between a portable information devices (PIDs) and a network server through a network connected telecommunication device.

DESCRIPTION OF THE RELATED ART

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more well-known CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or de-activate a CLASS feature using "*" directives (e.g., *69 to automatically return a call to the most recent caller). CLASS features may also be implemented with the use of out-of-band data CLASS feature data is typically transmitted between local Class-5 switches using the Signaling System 7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound and converting the sound from the handset to analog signals.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. The display functions are effectively limited to displaying text, again, as a "dumb" terminal.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is no more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones. For example, such a telephone may include substantially the computer resources of a typical personal computer.

Various data network content providers (e.g. Yahoo, America Online, MSN, etc.) have implemented a communications service that has become known as instant messaging. Instant messaging allows subscribers of the content providers to sense when other selected subscribers are connected and to send one or more of the subscribers a message. One problem with the present instant messaging systems is that they are virtually all proprietary in nature. The service is limited to those that subscribe to the service. Another problem with the present instant messaging systems is a lack of flexibility with respect to the media format used for communication. Typically, instant messaging is limited to text communication. The sender types a message into an instant messaging dialog box and instructs the service to send (e.g. hitting "SEND" button). The receiver receives the text message in the instant messaging dialog box on the receiver's computer screen.

It would be desirable to provide new features and enhancements to telephony service that accommodates and conforms to users' needs.

It would also be desirable to provide features and capabilities to telephone service that create new opportunities for users and for service providers.

It would be desirable to improve instant messaging services.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

The following references to patent applications filed concurrently herewith are incorporated be reference:

"System and Method for Controlling Telephone Service Using a Wireless Personal Information Device" to Schuster, et al.

"System and Method for Advertising Using Data Network Telephone Connections" to Schuster, et al.

"System and Method for Providing User-Configured Telephone Service in a Data Network Telephony System" to Sidhu, et al.

"System and Method for Interconnecting Portable Information Devices Through a Network Based Telecommunication System" to Schuster, et al.

"System and Method for Enabling Encryption on a Telephony Network" to Schuster, et al.

"System and Method for Using a Portable Information Device to Establish a Conference Call on a Telephony Network" to Schuster, et al.

"System and Method for Associating Notes with a Portable Information Device on a Network Telephony Call" to Schuster, et al.

"System and Method for Providing Shared Workspace Services Over a Telephony Network" to Schuster, et al.

"System and Method for Providing Service Provider Configurations for Telephones in a Data Network Telephony System" to Schuster, et al.

The following additional references are also incorporated by reference herein:

"Multiple ISP Support for Data Over Cable Networks" to Ali Akgun, et al.

"Method and System for Provisioning Network Addresses in a Data-Over-Cable System" to Ali Akgun, et al., Ser. No. 09/218,793.

"Network Access Methods, Including Direct Wireless to Internet Access" to Yingchun Xu, et al., Ser. No. 08/887,313

A. PID-Enabled Data Network Telephony System

Figure 1:
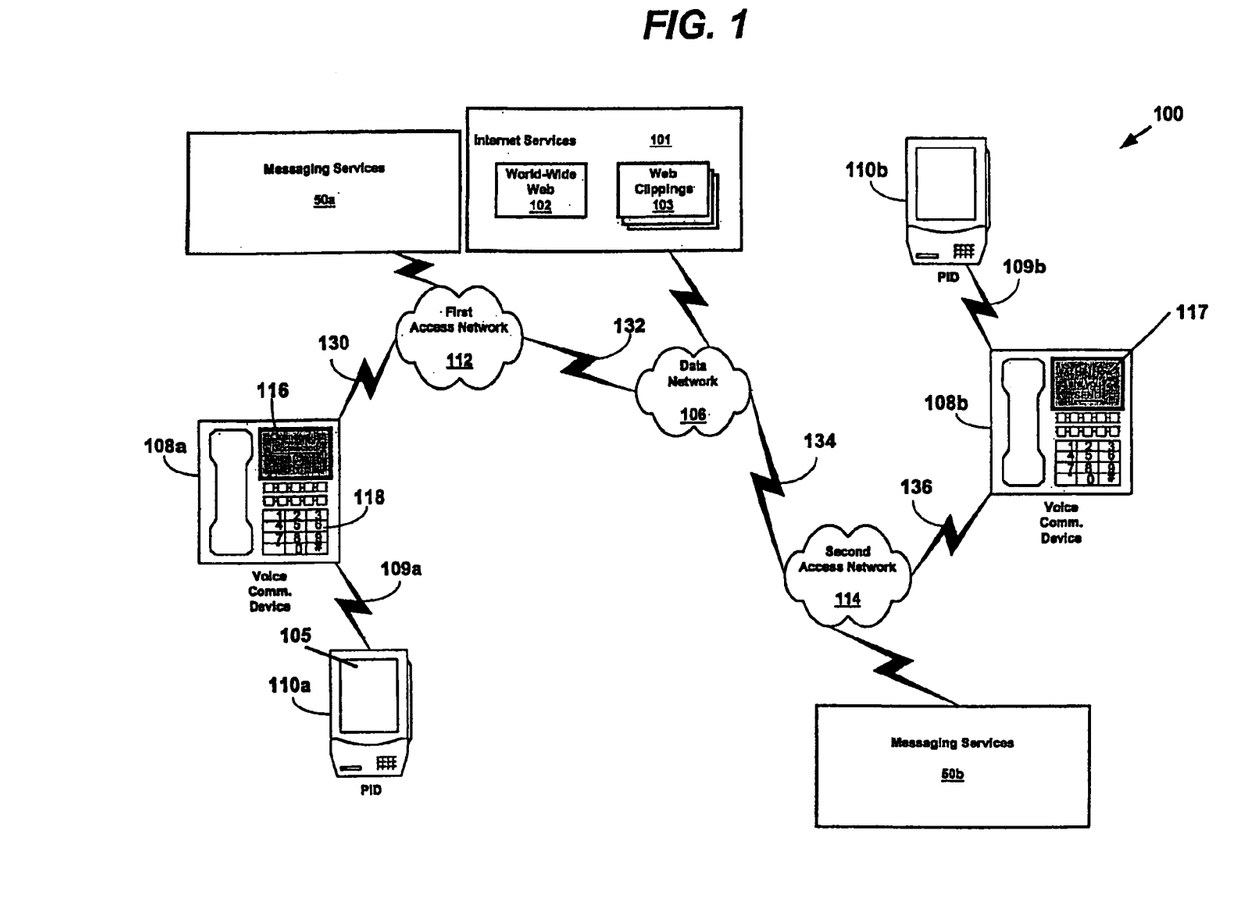
FIG. 1 is block diagram of a network telephony system according to one embodiment of the present invention.

FIG. 1 is a block diagram showing an exemplary embodiment of a system 100 for implementing messaging services according to one embodiment of the present invention. The system includes a first voice communication device 108a linked to a first access network 112 via connection 130 may communicate over a data network 106 by connecting via the first access network 112. A second voice communication device 108b is linked to a second access network 114 through connection 136 and may communicate over the data network 106 by connecting via the second access network 114.

A system for providing messaging services 50a,b is connected to the data network 106 to permit parties to a voice communication to communicate messages with other parties connected to the data network 106. The messaging services 50a performs messaging for the user of the first voice communication device 108a and the messaging services 50b performs messaging services for the user of voice communication device 108b.

The data network 106 in the system 100 typically includes one or more Local Area Networks (LANs) connected to one another or to a Wide-Area Network (WAN), such as an Internet Protocol (IP) network, to provide wide-scale data connectivity. The data network 106 may use Voice Over Packet (VOP) schemes in which voice signals are carried in data packets. The network 106 may also include a connection to the Public Switched Telephone Network (PSTIN) to allow for voice connections using traditional circuit switching techniques. In one embodiment, the data network 106 may include one or more LANs such as Ethernet LANs and support data transport protocols for performing Voice-over-Internet-Protocol (VoIP) techniques on the Internet. For further details regarding VoIP, see the information available through the Internet Engineering Task Force (IETF) at www.ietf.org. In addition, an Internet Telephony gateway may be included within the system 100 to allow for voice connections to users connected by subscriber lines at a PSTN Central Office.

The data network 106 may be used to access a variety of Internet services 101. For example, the Internet includes the World-Wide Web102, which is a well-known system for exchanging data over the Internet. The World-Wide Web 102 is commonly used to access targeted information using a computer workstation and an application on the workstation called a browser. With respect to PID's, many Internet Content Providers offer a variety of Web clippings 103 to permit viewing World-Wide Web data on a PID which is smaller than a workstation. One advantage of the system 100 in FIG. 1 is that web clippings 103 and other Internet services 101 may be accessed using the PID 110a,b without having to place a telephone call over the wireless cellular network.

The voice communication devices 108a–b (described further below with reference to FIG. 3) typically include a voice input, a voice output and a voice processing system. The voice processing system converts voice sound to digital data signals that are communicated on a voice connection over the data network. The voice processing system also converts digital data signals received from the voice connection to voice sound. The voice communication devices 108a–b typically include a central processing unit and memory to store and process computer programs. Additionally, each voice communication device 108a–b typically includes a unique network address, such as an IP address, in memory to uniquely identify it to the data network 106 and to permit data packets to be routed to the device.

A first PID 110a linked to the first voice communication device 108a via connection 109a may communicate over the data network 106 by connecting via the first access network 112. A second PID 110b linked to the second voice communication device 108b via connection 109b may communicate over the data network 106 by connecting via the second access network 114. The PIDs 110a–b each contain user attributes stored in a user information data base. The user attributes may contain such information as a user identifier, schedule information, and other information that is associated with a user of the PID 110a or 110b. The PIDS 110a–b each include a user interface allowing a user to easily enter and retrieve data. In a preferred embodiment, the user interface includes a pressure-sensitive display that allows a user to enter input with a stylus or other device. An example of a PID with such an interace is a PDA (Personal Digital Assistant), such as one of the Palm™ series of PDAs offered by Palm. The PIDs 110a–b may include other functionality, such as wireless phone or two-way radio functionality.

Links 109a–b are point-to-point links, and may be entirely or partially wireless, or they may be hard-wired connections. Each of the links 109a–b is preferably a wireless link, such as an infrared link specified by the Infrared Data Association (IrDA) (see irda.org for further information) or a radio frequency (RF) link such as the Bluetooth system (see www.bluetooth.com for further information). However, the point-to-point link can also be a hardwired connection, such as an RS-232 serial port.

In one embodiment, the voice communication device 108a includes a handset with a receiver and transmitter similar or identical to handsets of traditional circuit-switched telephones. A console on which the handset sits may include the voice processing system, a display 116, and a keypad 118.

In a preferred embodiment, a portion of the voice communication device 108a utilizes an NBX 100™ communication system phone offered by 3Com® Corporation. In alternative embodiments, the voice communication device 108a may include any device having voice communications capabilities. For example, a personal computer having a microphone input and speaker output may also be used to implement the voice communication device 108a. Other configurations are also intended to be within the scope of the present invention.

The details relating to operation of the voice communication devices 108a and 108b depend on the nature of the data network 106 and the nature of the access networks 112, 114 connecting the voice communication devices 108a and 108b to each other and/or to other network entities. The access networks 112, 114 typically include any high bandwidth network adapted for data communications, i.e. a network having greater than 64,000 bits-per-second (bps) bandwidth. The access networks 112, 114 may link to the voice communication devices 108a–b using an Ethernet LAN, a token ring LAN, a coaxial cable link (e.g. CATV adapted for digital communication), a digital subscriber line (DSL), twisted pair cable, fiberoptic cable, an integrated services digital network (ISDN) link, and wireless links. In embodiments that may not require bandwidth greater than 64,000 bps, the access networks 112, 114 may also include the PSTN and link the voice communications devices 108a–b by an analog modem.

B. System for Connecting to Data Network Services Using a Data Network Telephony System One advantage of the PID-Enabled Data Network Telephony System 100 in FIG. 1 is that it may be used to provide PID connectivity to the data network 106. In one embodiment, the PIDs 110a are able to connect to data network services through a user interface on the PID 110a. The PID 110a includes a web application for retrieving information that can be communicated from the Internet services 101 over the data network 106, transported across the first access network 112, to the voice communication device 108a. The PID 110a can receive the information across the link 109a for display on the PID 110ba.

In one embodiment, the PID 110a uses the Point-to-Point Protocol (PPP) to communicate with the voice communications device 108a. The PID 110a communicates requests for services to the voice communications device 108a to send over the data network 106. The PID 110a receives the Internet service offerings (e.g. web clippings) from the data network through the voice communication device 108a.

A voice-over-data channel for communicating voice-over-data may or may not concurrently exist with this communication of information over a data channel. In this way, a user of the PID 10a can receive information from the Internet services 101 while voice signals are communicated between the voice communication device 108a and the voice communication device 108b. Alternatively, the user may use the PID 110a connection to the Internet services independently of any telephone calls.

Another advantage of the system 100 in FIG. 1 is that it may be used to provide messaging services, including the services known in the art as instant messaging. The messaging services 50a may be implemented in conjunction with a telephony server that controls the telephone connections made by the user of the first voice communication device 108a. Whenever the user initiates a telephone connection, the messaging services 50a may announce the user's presence on the data network 106 and look for pending connections involving selected users. The messaging services 50a may maintain a list of selected users with whom the user of the first voice communication device 108a may wish to send messages. The user may build the list via communications with the telephony service provider. For example, the service provider may offer a list building facility on a web page using the World-Wide Web 102. Using the system 100 in FIG. 1, a telephone service provider may add instant messaging as another value-adding feature. In a preferred embodiment, the messaging services 50a may be offered in a manner that supports a variety of messaging services protocols.

1. Local Area Network as an Exemplary Access Network

Figure 2:
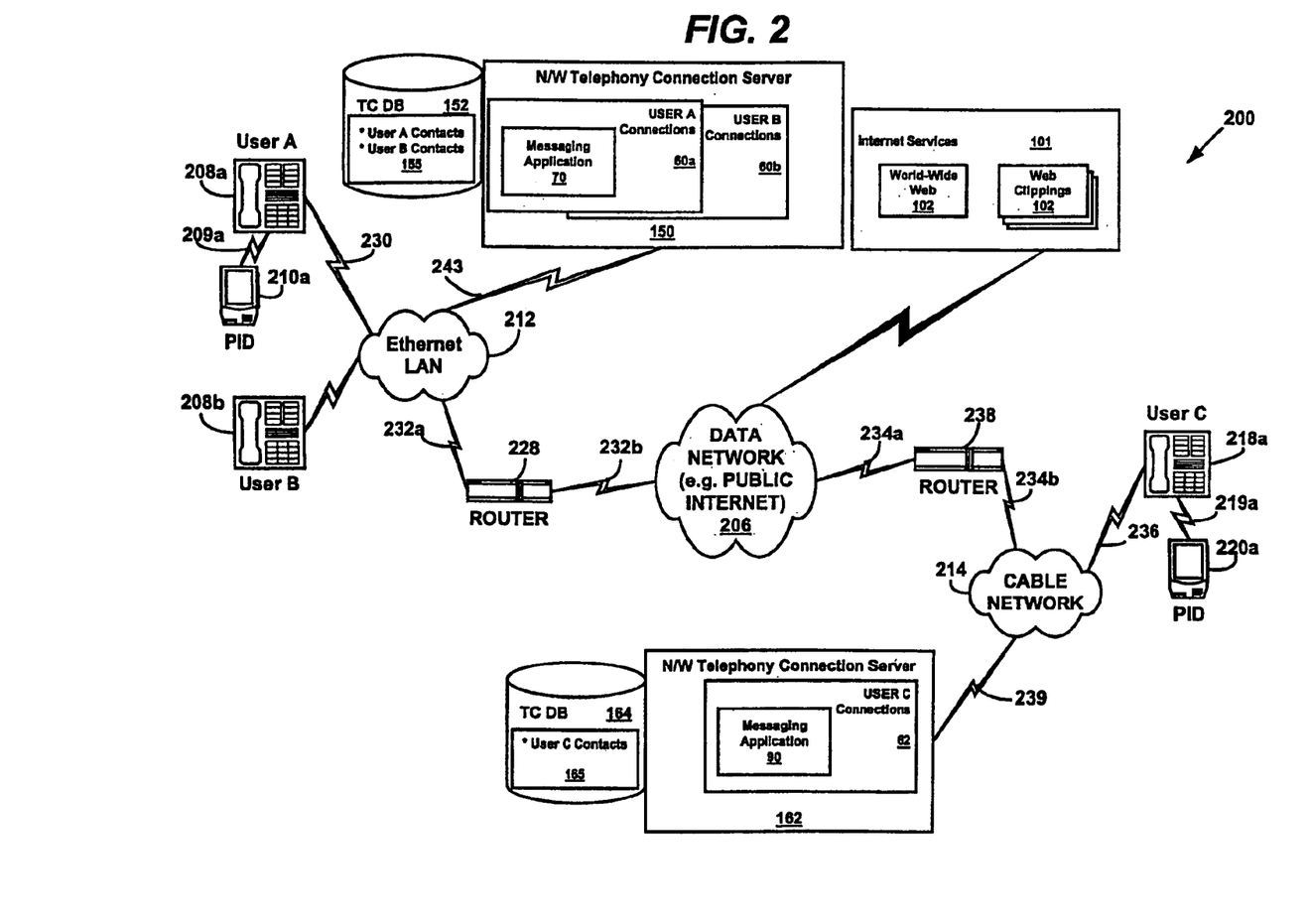
FIG. 2 is a block diagram showing a system for using a telephony system to perform messaging services according to an exemplary embodiment of the present invention.

FIG. 2 is a block diagram showing one example of the system 100 of FIG. 1 for providing messaging services 50 according to one aspect of the present invention. The system 200 in FIG. 2 includes a local area network 212, connected to a data network 206 by a first router 228. A cable network 214 is connected to the data network 206 by a second router 238. Those of ordinary skill in the art will appreciate that while FIG. 2 illustrates the access networks as the local area network 212 and the cable network 214, any other type of network may be used. For example, the local area network 212 and/or the cable network 214 may be replaced by ISDN, DSL, or any other high-speed data link.

The local area network 212 provides data connectivity to its network elements, such as a first data network telephone 208a, a second data network telephone 208b, and a first network telephony connection server 150. The local area network 212 in FIG. 2 is an Ethernet LAN operating according to the IEEE 802.3 specification, which is incorporated by reference herein, however, any other type of local area network may be used. The local area network 212 uses the router 228 to provide the data network telephone 208a and the first network telephony connection server 150 with access to the data network 206. For example, the router 228 may perform routing functions using protocol stacks that include the Internet Protocol and other protocols for communicating on the Internet.

The first network telephony connection server 150 provides telephony registration, location and session initiation services for voice connections in which its members are a party. A user may register for telephony service with an administrator of the first network telephony connection server 150 and receive a user identifier and a telephone identifier. The user identifier and telephone identifier may be sequences of unique alphanumeric elements that callers use to direct voice connections to the user. The first network telephony connection server 150 registers users by storing user records in a first registration database 152 in response to registration requests made by the user.

The call setup process and the user and telephone identifiers preferably conform to requirements defined in a call management protocol. The call management protocol is used to permit a caller anywhere on the data network to connect to the user identified by the user identifier in a data network telephone call. A data network telephone call includes a call setup process and a voice exchange process. The call setup process includes steps and message exchanges that a caller and callee perform to establish the telephone call. The actual exchange of voice signals is performed by a data communications channel. The data communications channel incorporates other data transport and data formatting protocols, and preferably includes well-known data communications channels typically established over the Internet.

The call management protocol used in FIG. 2 is the Session Initiation Protocol (SIP), which is described in M. Handley et al., "SIP: Session Initiation Protocol," IETF RFC 2543, March 1999, incorporated by reference herein, however, any other such protocol may be used. Other protocols include H.323, the Media Gateway Control Protocol (MGCP), MEGACO, etc.

The network telephony connection server 150 may be used to provide telephony service for mobile users. A user may be registered to use the first network telephone 208a (which is identified by its telephone identifier), but move to a location near the second network telephone 208b. The user may re-register as the user of the second network telephone 208b. Calls that identify the user by the user's user identifier may reach the user at the second network telephone 208b.

The network telephony connection server 150 includes a messaging application 70 which provides messaging services for users when the users are parties to telephone connections, such as a User A connection 60a and a User B connection 60b. User A and User B connections 60a, b may be initiated using a call management protocol as described above and in further detail below.

The messaging application 70 may be enabled, activated, or invoked whenever the network telephony connection server 150 establishes a connection, for example, for User A with User B. The messaging application 70 may retrieve a contact list from a user contact lists 155. The user contact lists 155 may contain user identifiers for other users with whom User A may communicate messages during a telephone connection. The messaging application 70 may retrieve the list and search for connections over the data network 206 that involve the users in the user contact list 155. The connection established by or with User A may also be sensed by users on the contact list that are involved in a telephone connection. Those users thus receive notice that User A is available for communicating messages.

The user contact lists 155 may preferably be maintained in a database accessible by the data network telephony server 150. For example, the user contact lists 155 may be maintained with the users' account information. The user may create and/or edit the list 155 using a variety of methods. In one example, the user may access his user account using a web page. Such a web page may include a facility to create and/or edit the user contact list 155. The lists 155 may also be created and/or modified using a telephone connection combining both voice (e.g. voice mail techniques) and the data user interface on the data network telephone 208. In another alternative embodiment, the user contact lists may be maintained in the data network telephone 208 memory.

The messaging application 70 may report the identity of any user from the list to User A when it detects that a user in the list is a party to a connection. This notifies User A that those users are available and that communications connections may be established to communicate with those users. The identities of the available users may be displayed on the display 116 of the voice communications device 108*a* as shown in FIG. 1. User A may then select one of the user identities using known techniques to send that user a message, or User A may receive a message from one of those users.

In one preferred embodiment, the messaging application 70 performs the functions of the messaging services. The messaging application 70 may establish a data communications channel to communicate messaging options to User A. The data network telephone 208*a* may receive data and communicate user input to the messaging application 70 on such a data channel. For example, the messaging application 70 may communicate the data to present the display 116 shown in FIG. 1. User A may then select a user on the list to whom to send a message. When the user is selected, the display may switch to a messaging input screen. For example, the second display 117 in FIG. 1 shows an example of a messaging input screen, which may include the identity of the user to whom the message is to be sent (e.g. User A) and a data input area in which a message may be entered. Alternatively, messages may be communicated as voice messages. In still another alternative embodiment, text, image and/or voice messages may be communicated via the user's PID 210*a*.

The messaging application 70 may remain active as long as User A is involved in a telephone connection. The messaging application 70 may also continue to monitor whether any other users in User A's contact list 155 establishes a telephone connection, and therefore become available for messaging.

2. Cable Network as an Exemplary Access Network

The system 200 in FIG. 2 also shows a cable network 214 connected to the data network 206 by a router 238. The cable network 214 provides data network access to its network elements, which in FIG. 2 include a third data network telephone 218*a* and a second network telephony connection server 162. The users of the data network telephone 218*a* connected to the cable network 214 may communicate over the data network 206 with the users of the data network telephones 208*a–b* connected to the local area network 212.

The cable network 214 includes any digital cable television system that provides data connectivity. In the cable network 214, data is communicated by radio frequency in a high-frequency coaxial cable. The cable network 214 may include a head-end, or a central termination system that permits management of the cable connections to the users.

3. Providing Telephony Services

The second network telephony connection server 162 is preferably a SIP-based server that performs call initiation, maintenance and teardown for the data network telephone 218*a* connected to the cable network 214. The second network telephony connection server 162 may be similar or identical to the first network telephony connection server 150 connected to the local area network 212.

The system 200 shown in FIG. 2 permits the data network telephones 208*a–b* connected to the local area network 212 to communicate with the data network telephone 218*a* connected to the cable network 214. The system shown in FIG. 2 uses SIP in order to establish, maintain, and teardown telephone calls between users.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the network telephony connection server 150 and 162. Not all server types are required to implement the embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used.

Redirect servers process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can be either forking or non-forking. A forking proxy can, for example, ring several data network telephones at once until somebody takes the call. Registrar servers are used to record the SIP address (the SIP URL) and the associated IP address. The most common use of a registrar server is for the UAC to notify the registrar where a particular SIP URL can be reached for a specified amount of time. When an INVITE request arrives for the SIP URL used in a REGISTER message, the proxy or redirect server forwards the request correctly.

At the local area network 212, the central registrar/proxy server, such as the first network telephony server 150, is the primary destination of all SIP messages trying to establish a connection with users on the local area network 212. Preferably, the first network telephony server 150 is also the only destination advertised to the SIP clients outside the LAN 212 on behalf of all the SIP clients residing on the LAN 212. The network telephony server 150 relays all SIP INVITE messages to the appropriate final destination (or another SIP proxy), based on a database lookup using the first SIP database 152. It allows all mobile clients to register with their current locations.

Similarly, the second network telephony server 162 is the primary destination of all SIP messages trying to establish a connection with the data network telephone 218*a* connected to the cable network 214. Preferably, the second network telephony server 162 is also the only destination advertised to the SIP clients outside the cable network 214 on behalf of all the SIP clients (e.g. data network telephones) residing on the cable network 214. The second network telephony server 162 relays all SIP INVITE messages to the appropriate final destination (or another SIP proxy), based on a database lookup using the second SIP database 164.

The data network telephones 208*a–b* and 218*a* in the system 200 preferably have pre-programmed device identifiers (e.g. phone numbers), represented as SIP-URL's that are of the form sip: user@domain. An example is sip: 8475551212@3Com.com. After power-up, each of the data network telephones 208a–b and 218a sends a SIP REGISTER message to the default registrar, such as the network telephony servers 150 and 162. When a call arrives at one of the network telephony servers 150 or 162 for any of the registered SIP URLs, the server will forward the call to the appropriate destination. If a data network telephone is moved to a new location, all calls to the associated SIP URL will still be properly routed to that device. In other words, the system in FIG. 2 provides device mobility in the sense that calls will "follow" the data network telephone according to its SIP URL. This is especially useful if the data network telephone 208a–b or 218a is running the DHCP (Dynamic Host Configuration Protocol) so that when the location is changed, the IP address is also automatically changed.

An advantage of the system in FIG. 2 is that once the call is established between data network telephones, the data network 206 provides data connectivity for a plurality of data communications channels. For example, the data network telephones 208a and 218a can communicate voice signals as voice-over-data packets on a voice-over-data channel. The data network telephones 208a and 218a can also communicate data (such as PID data) as data packets on a data channel. For example, the data may be communicated to and from the PIDs 210a and/or 220a across links 209a and 219a to the data network telephones 208a and 218a, where data is packetized and depacketized as part of the process for communicating the data packets across the data network 206 and any access networks, such as the Ethernet LAN 212 and the cable network 214. The data channels may be established to communicate data to and from the Internet services 101.

4. The Data Network Telephones

The data network telephones 208a–b are preferably telephones that include an Ethernet communications interface for connection to an Ethernet port. The Ethernet phones in FIG. 2 support the Internet Protocol (IP), using an IP address that is either statically configured or obtained by access to a Dynamic Host Configuration Protocol (DHCP) server.

Figure 3:
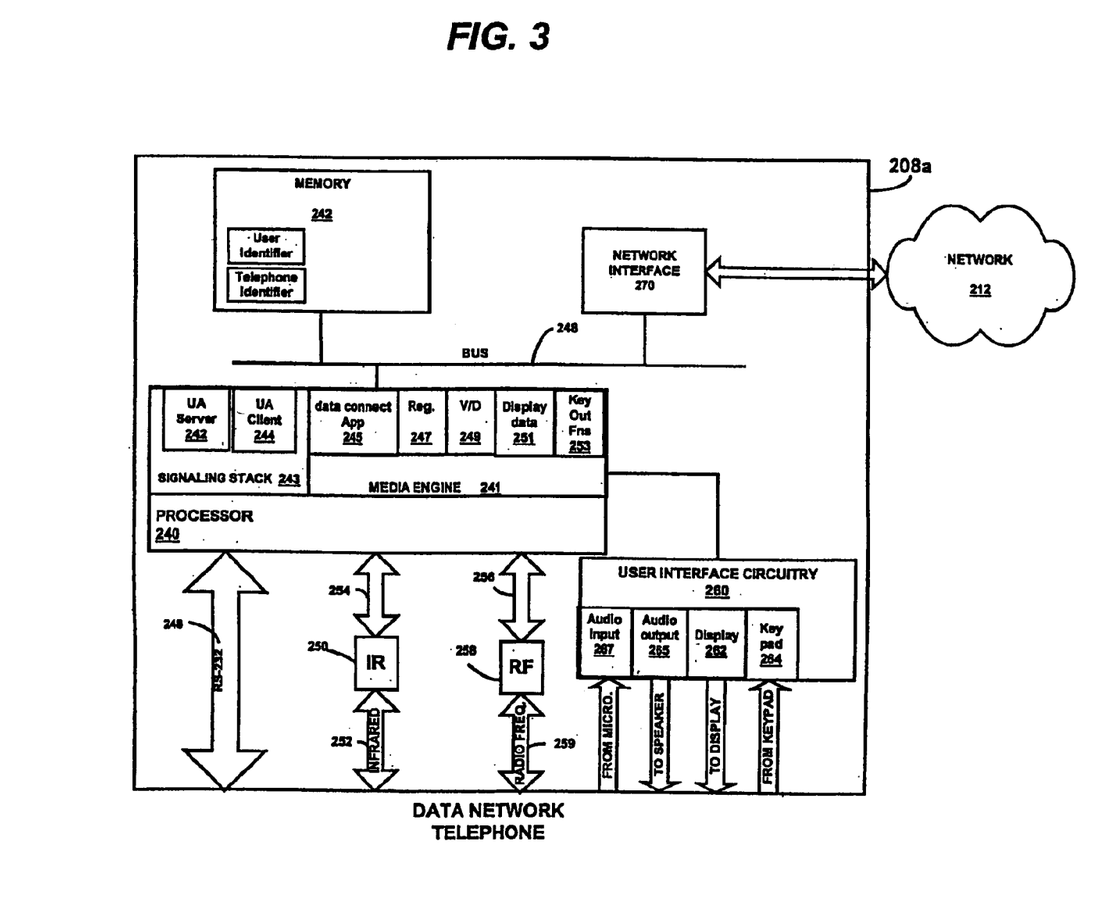
FIG. 3 is a block diagram of a data network telephone according to an exemplary embodiment of the present invention.

FIG. 3 is a block diagram showing the data network telephone 208a connected to the local area network 212 in FIG. 2. The data network telephone 208a in FIG. 3 is connected to the network 212 by a network interface 270. The network interface 270 may, for example, be a network interface card, and may be in the form of an integrated circuit. A bus 248 may be used to connect the network interface 270 with a processor 240 and a memory 242. Also connected to the processor are user interface circuitry 260 and three alternative link interfaces to a PID, such as the PID 210a.

A first link interface 248 includes an RS-232 serial connection and associated coupling hardware and mechanisms. The first alternative link interface 248 may, for example, be a docking cradle for a PDA (Personal Digital Assistant), in which information can be transferred between the PDA and the data network telephone 208a. The second alternative link interface comprises a first connection 254, such as an RS-232 connection, along with infrared circuitry 250 for converting signals into infrared output and for accepting infrared input. An infrared interface 252 may also be included within the second alternative link interface. The third alternative link interface comprises a first connection 256, such as an RS-232 connection, along with radio-frequency circuitry 258 for converting signals into radio frequency output and for accepting radio frequency input. A radio frequency interface 259 may also be included as part of the third alternative link interface.

The three alternative link interfaces described above are merely examples, and additional means for implementing the link interface between the data network telephone 208a and the PID 210a may also be used. Although three link interfaces are shown in FIG. 3, there may be only one such interface in the data network telephone 208a. More than one link interface may be included to improve flexibility and to provide redundancy in case of failure of one of the link interfaces.

The user interface circuitry 260 includes hardware and software components that access the functions of the handset, display, and keypad to provide user input and output resources for functions in the processor 240. The user interface circuitry includes a display interface 262, a keypad interface 264, an audio output interface 265, and an audio input interface 267.

The audio input interface 267 may receive voice signals from a microphone or other audio input device and convert the signals to digital voice information. The conversion preferably conforms to the G.711 ITU Standard. Further processing of the digital signal may be performed in the audio input interface 267, such as providing compression (e.g. using G.723.1 standard) or providing noise reduction, although such processing may also be performed in the processor 240. Alternatively, the audio input interface 267 may communicate an analog voice signal to the processor 240 for conversion to digital information within the processor 240.

The audio output interface 265 receives digital information representing voice from the processor 240 and converts the information to audible sound, such as through a magnetic speaker. In one embodiment, the audio output interface 265 receives information in the form of G.711, although other processing such as decompression may be performed in the audio output interface 265. Alternatively, the processor 240 may convert digital information to analog voice signals and communicate the analog voice signals to the audio output interface 265.

The keypad interface 264 and the display interface 262 include well-known device interfaces and respective signal processing techniques. The user interface circuitry 260 may support other hardware and software interfaces. For example, a videophone implementation might also include a camera and monitor. The data network telephones of the present invention are not limited to telephones or videophones—additional user interface types, for example, such as the ones needed for computer games, are also contemplated as being within the scope of the present invention. In addition, some of the features described here, such as the display interface 262, are optional and serve to enhance the functionality of the first data network telephone 208a.

The processor 240 may consist of one or more smaller processing units, including, for example, a programmable digital signal processing engine. In the preferred embodiment, the processor is implemented as a single ASIC (Application Specific Integrated Circuit) to improve speed and to economize space. The processor 240 also may include an operating system, and application and communications software to implement the functions of the data network telephone 208a. The operating system may be any suitable commercially available embedded or disk-based operating system, or any proprietary operating system.

The processor 240 includes a media engine 241 and a signaling stack 243 to perform the primary communications and application functions of the data network telephone 208a. The purpose of the signaling stack in the exemplary data network telephone 208a is to set up, manage, and tear down a call. During the setup phase, a user may use the keypad to enter a user identifier to call. Alternatively, a PID such as PID 210a may transmit the user identifier of the party across the first link 209a. The signaling stack 243 receives the user entry and formats a request message to send to the user identified by the user identifier to initiate a telephone call. When the request message is sent, the location of the user identified by the user identifier is discovered, communication parameters, such as the supported voice CODEC types are exchanged, and a voice-over-data channel is established. During the management phase, for example, other parties may be invited to the call if needed. During the tear down phase, the call is terminated.

The signaling protocol used in the data network telephone 208a in FIG. 3 is the SIP protocol. In particular, the signaling stack implements a User Agent Client 244 and a User Agent Server 242, in accordance with the SIP protocol. Alternative signaling protocols, such as the ITU-T H.323 protocol, MGCP, MEGACO, and others, may also be used to implement the present invention.

Once the call is set up, the media engine 241 manages the communication over one or more data communications channels using network transport protocols and the network interface 270. The media engine 241 sends and receives data packets having a data payload for carrying data and an indication of the type of data is being transported. The media engine 241 in the data network telephones 208a may sample the voice signals from the audio input 267 (or receive voice samples from the audio input 267), encode the samples, and build data packets on the sending side. On the receiver side, in addition to performing the reverse operations, the media engine also typically manages a receiver buffer to compensate for network jitter. Similar procedures may be performed for other types of data, such as graphical data, or for data used in PID applications such as email, contacts data, calendar data, other non-voice sound data, interactive game data, etc.

The media engine 241 may also include hardware and software components for performing registration functions 247, voice-over-data functions 249, display data functions 251, and keypad output functions 253. The media engine 241 processes data that is received from the network 212, and data to be sent over the network 241.

For data that is received from the network 212, the media engine 241 may determine from the type of data in the packet (such as by examining a packet header) whether packets contain sampled voice signals or other data types. Packets containing sampled voice signals are processed by the voice-over-data function 249. The voice-over-data function 249 preferably conforms to a protocol for formatting voice signals as digital data streams. While any suitable protocol may be used, the media (i.e. the voice signal) is preferably transported via the Real Time Protocol (RTP), which itself is carried inside of UDP (User Datagram Protocol). RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," JETF RFC 791, September 1981, both of which are incorporated by reference herein.

Packets containing data for use in registering the data network telephone 208a with a network telephony service are processed by the registration function 247. By registering the data network telephone 208a, a user may establish with the network telephony connection server 150 that calls addressed to the user's user identifier may be connected to the data network telephone 208a. Registration may occur when the data network telephone 208a sends a request to register to a service provider host, such as the network telephony connection server 150. The service provider host may respond by setting the user's user identifier to correspond to the telephone identifier of the data network telephone 208a, and by acknowledging the request with a status message to the data network telephone 208a. In one embodiment, a request to register the data network telephone 208a to a default user is automatically sent during power-up of the data network telephone 208a.

Other features may be added to the registration functions 247, or implemented as extensions to the registration functions 247. For example, the first data network telephone 208a may be provisioned to provide selected network telephony services by establishing a data connection with a service provider, requesting the selected services, and receiving data that ensures that the services have been successfully provisioned. Such services may include, for example, caller identification, call forwarding, voice mail and any other services offered by the network telephony service provider to enhance the capabilities of the first data network telephone 208a. One advantage of provisioning functions is that services may be ordered for temporary use in a manner convenient to the user.

Packets containing data for display on a display device of the data network telephone 208a are processed by the display data function 251. The display data function 251 may be used for displaying, for example, the names and user identifiers of other parties to the call, the status of the telephone call, billing information, and other information.

For data to be sent over the data network 212, the media engine 241 formats the data as data packets in accordance with a selected protocol. The selected protocol is preferably a protocol that is supported by data network telephones that will receive the data being transported. The media engine 241 may include a data connection application 245 to perform functions relating to data connections over the data network 206. The data network telephone 208 may include a data connection management protocol (e.g. the hypertext transport protocol, or http) to handle data connections. Alternatively, the SIP protocol may be used to establish data connections as well as voice connections. The data connection application 245 may also perform proxy services to permit the PID 108 to establish data connections.

The voice-over-data function 249 formats voice samples according to the protocol used by the receiving data network telephone. In one preferred embodiment, the voice over data function 249 formats voice samples as RTP packets. The registration function 247 and the keypad output function 253 may control the transport of data that does not represent voice signals.

The data network telephones 208b and 218a are preferably similar or identical to the data network telephone 208a. For each of the data network telephones 208a–b and 218a, many of the features described in FIG. 3 are optional and their inclusion depends on the services to be offered.

5. The Portable Information Devices (PIDs)

Figure 4:
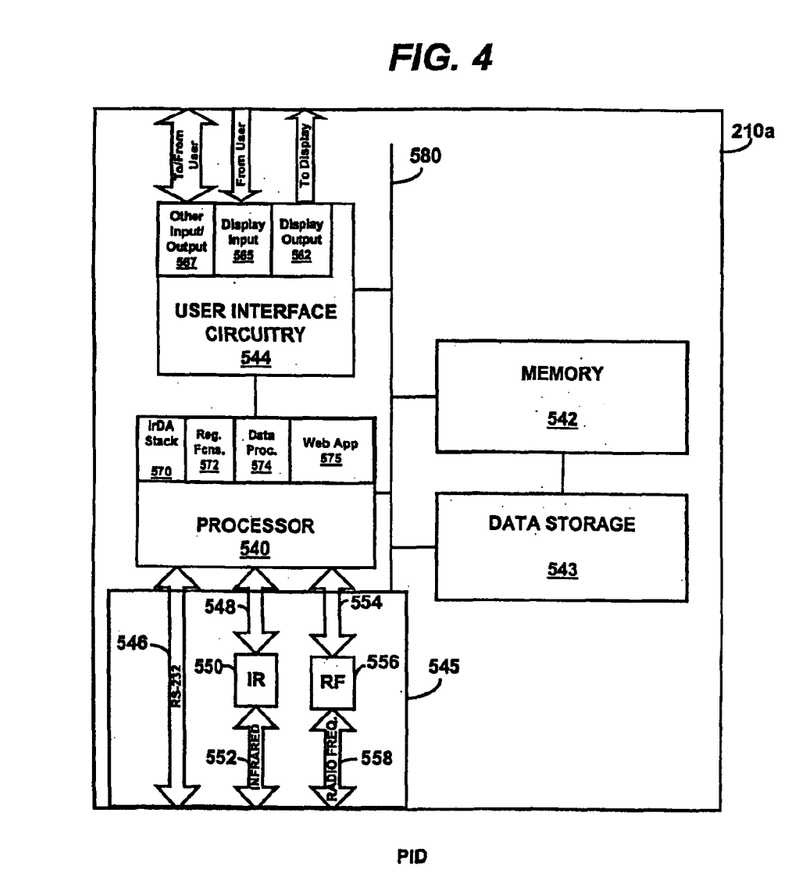
FIG. 4 is a block diagram of a PID according to an exemplary embodiment of the present invention.

FIG. 4 is a block diagram showing the exemplary PID 210a that can communicate via the link 209a with the data network telephone 208a connected to the LAN 212. The PID 210a may be linked to the data network telephone 208a through a link interface 545. A bus 580 may be used to connect the point-to-point interface 545 with a processor 540, a memory 542, data storage 543, and user interface circuitry 544.

The link interface 545 shown in FIG. 4 illustrates three alternative link interfaces for establishing a link to a data network telephone, such as the data network telephone 208a.

A first link interface 546 includes an RS-232 serial connection and associated coupling hardware mechanisms. The first alternative link interface 546 may, for example, be for coupling with a PDA docking cradle, in which information can be transferred between the PDA and the data network telephone 208a. The second alternative link interface comprises a first connection 548, such as an RS-232 serial connection, along with infrared circuitry 250 for converting signals into infrared output and for accepting infrared input. An infrared interface 552 may also be included within the second alternative link interface. The third alternative link interface comprises a first connection 554, such as an RS-232 connection, along with radio-frequency circuitry 556 for converting signals into radio frequency output and for accepting radio frequency input. A radio frequency interface 558 may also be included as part of the third alternative interface. The radio interface 554/556/558 may be implemented according to the Bluetooth specifications, described at www.bluetooth.com.

The three alternative link interfaces described above are merely exemplary, and additional means for implementing the interface between the PID 210a and the data network telephone 208a may also be utilized. Although three link interfaces are shown in FIG. 4, there may be only one such interface in the PID 210a. More than one link interface may be included to improve flexibility and to provide redundancy in case of failure of one of the link interfaces.

The user interface circuitry 544 includes hardware and software components that provide user input and output resources for functions in the processor 540. The user interface circuitry includes a display output 562, a display input 565, and an additional input/output interface 567.

The display output 562 preferably receives digital information representing graphical data from the processor 540 and converts the information to a graphical display, such as text and/or images, for display on a display screen, for example.

The display input 565 may receive data inputs, such as graphical data inputs, from a user of the PID 210a. The graphical data inputs are preferably entered by the user with a stylus on a pressure-sensitive display screen, and may include text, drawings, or other objects that are capable of being graphically presented.

The additional input/output interface 567 allows the user to enter other types of data besides graphical data into the PID 210a. For example, audio data, additional graphical data, or additional input, such as video camera input for example, may be entered through the additional input/output interface 567. The data may also include data formatted for operation with particular applications on the PID. For example, email data, calendar data, contacts data, database data, spreadsheets, notes, game data, etc. may also be entered. Touch-sensitive screen buttons are an exemplary method for a user to enter control data into the PID 210a.

The processor 540 may include an operating system, as well as application and communication software, to implement the functions of the PID 210a. The operating system may be any suitable commercially available operating system, or any proprietary operating system. The operating system and software may be stored on data storage 543, in the memory 542, or the may be embedded in the processor 540. Although the processor 540 is shown connected to the data storage 543 through a bus 580, other configurations may also be used. Similarly, the memory 542 may be configured other than as shown in FIG. 4, and may be embedded within the processor 540.

The PID 210a is able to send data to and receive data from the data network telephone 208a across a point-to-point link, such as the point-to-point link 209a shown in FIG. 1. A user enters PID data at the display input 565. The graphical data may be processed in the user interface circuitry 544 or it may go directly to the processor 540 or the memory 542. The processor 540 may also perform processing functions, such as compression.

A PID data application may be used to perform functions that may implement the display input, the display output, and the processing functions. For example, a web clippings application 575 may be used to request and receive information from Internet services 101 (shown in FIG. 2) in a format suitable for the PID 210. The information, or clippings are provided by the Internet services 101. The information retrieved as clippings could then be displayed through the display output 562 to enable the user to see a visual representation of the information.

If the user desires to request information from web clippings 103, a periodic request may be set up to make a request at a designated time as long as a link interface to the data network telephone 208 is active. Alternatively, the user may store links (e.g. hot links) and select the hotlinks using the stylus or other user input to request specific information at anytime. The request can be transmitted through one of the point-to-point interfaces 545, allowing the data to be received by the data network telephone 208a. An application in the data network telephone 208a receives the request across the point-to-point link, and the request is prepared for transmission across the data network 206, such as by the media engine 241 shown in FIG. 3. Preferably the request is converted to data packets and is communicated on a data channel across the LAN 212 through the router 228 across the data network 206 to the selected web clipping 103.

The web clipping 103 processes the request using well-known techniques (e.g. http). The requested information is formatted as data packets, preferably in the form of TCP/IP data packets to the data network telephone 208a. The data network telephone 208a may recognize the data packets as related to the previously made request and simply pass the information to the PID 210, or process the data packets.

The link 209a between PID 210a and the first data network telephone 208a can alternatively be implemented as an infrared link using all or parts of a specialized protocol, such as the Infrared Data Association (IrDA) protocol stack, where data is interpreted through the stack between application-layer processes at each end of the link.

Figure 5:
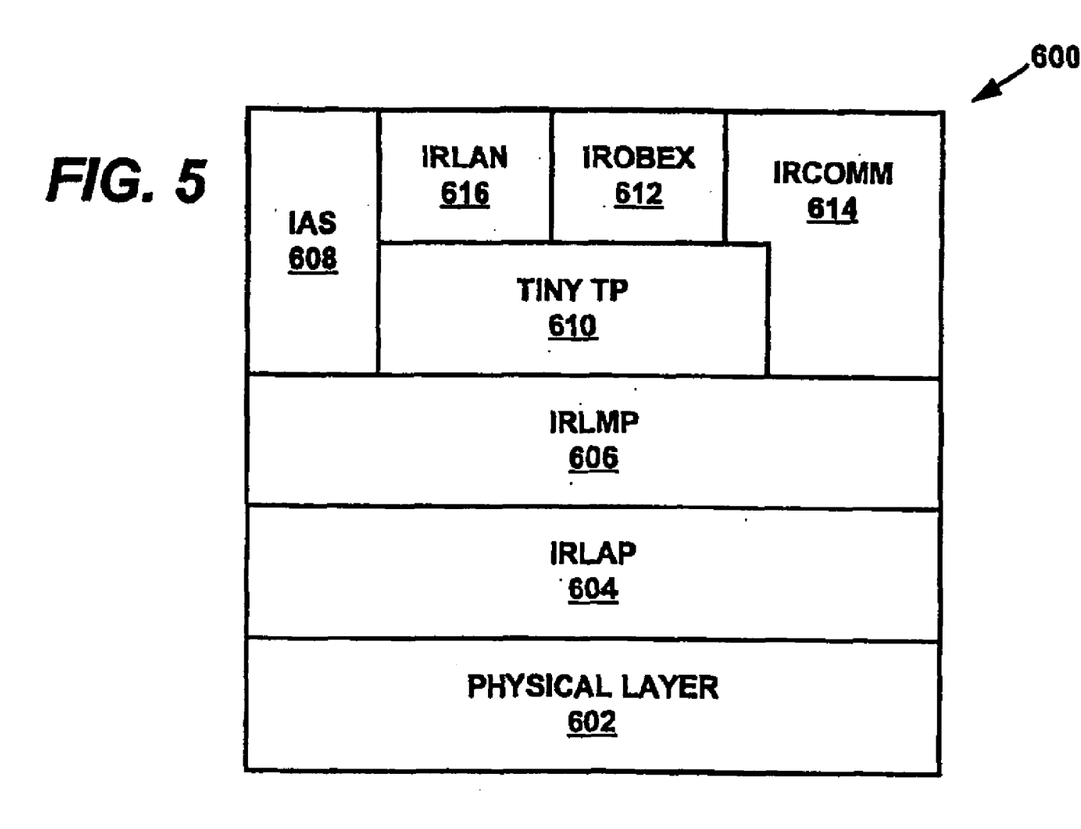
FIG. 5 is a stack layer diagram showing the layers of an IrDA stack.

FIG. 5 is a protocol diagram illustrating the layers of the IrDA protocol stack. An IrDA stack is implemented at each of the connection endpoints of an IrDA link. For example, the first PID 210a and the first data network telephone 208a could each implement an IrDA protocol stack to enable the link 209a. As a second alternative, two PIDs, such as the first PID 210a and the third PID 218a, may each contain an IrDA stack. In the second alternative, the communications between the PIDs and the data network telephones might take place without the assistance of IrDA. For example, IrDa data from the first PID 210a might be transmitted across the link 209a as a serial stream of data to the first data network telephone 208a, which might treat the IrDA data like any other data received from the first PID 210a The first data network telephone 208a could then assemble the IrDA data into packets, such as TCP/IP packets for transport across the access and data networks to the third data network telephone 218a. The third data network telephone 218a may disassemble the packets and forward the IrDA data (without interpreting the IrDA portions) across the link 219a to the third PID 220a. The third PID 220a could then process the IrDA information received across the networks.

The required layers of an IrDA protocol stack are the physical layer 602, the IrLAP layer 604, the IRLMP layer 606 and the IAS layer 608. The physical layer 602 specifies optical characteristics of the link, encoding of data, and framing for various speeds. The IrLAP (Link Access Protocol) layer 604 establishes the basic reliable connection between the two ends of the link. The IrLMP (Link Management Protocol) layer 606 multiplexes services and applications on the IrLAP connection. The IAS (Information Access Service) layer 608 provides a directory or "yellow pages" of services on an IrDA device.

The IrDA protocol also specifies a number of optional protocol layers, these protocol layers being TinyTP 610, IrOBEX 612, IrCOMM 614 and IrLAN 616. TinyTP (Tiny Transport Protocol) 610 adds per-channel flow control to keep traffic over the IrDA link moving smoothly. This important function is required in many cases. IrOBEX (Infrared Object Exchange protocol) 612 provides for the easy transfer of files and other data objects between the IrDA devices at each end of the link. IrCOMM 614 is a serial and parallel port emulation that enables existing applications that use serial and parallel communications to use IrDA without change. IrLAN (Infrared Local Area Network) 616 enables walk-up infrared LAN access for laptops and other devices. The use of the optional layers depends upon the particular application in the IrDA device. The IrDA protocol stack is defined by such standards documents as "IrDA Serial Infrared Physical Layer Link Specification", "IrDA 'IrCOMM': Serial and Parallel Port Emulation over IR (Wire Replacement)", "IrDA Serial Infrared Link Access Protocol (IrLAP)", "IrDA Infrared Link Management Protocol (IrLMP)", and "IrDA 'Tiny TP': A Flow-Control Mechanism for use with IrLMP", and related specifications published by the IrDA and available at http//www.irda.org/standards/specifications.asp and is incorporated by reference herein.

The IRDA protocol stack can be implemented at just the PID devices at the endpoints with the intermediate phones and networks simply providing a tunnel for the media stream attendant to the infrared links. Since PIDs, such as the Palm PDA, already have an IrDA stack implemented in them to support their infrared link to other devices and the benefits of the IrDA stack are already available. By using the layers of the IrDA protocol stack, the PID applications and the base applications in the phones can be simplified as the IrDA protocol layers take over certain functional capabilities. For example, the IrOBEX layer in each IrDA protocol stack can be used to transfer text and graphics object files, such as electronic business cards or whiteboard graphics, end-to-end between PID devices connected via data connected data network telephones.

With the IrDA stack being implemented only in the PIDs and not in the phones, only a small level of delay is introduced for stack interpretation by each PID and the connection provided is largely transparent to the applications in the PID devices, i.e. little or no modification to existing user applications in the PIDs is required. This approach may be more suitable for delay sensitive applications, such as interactive games involving the transfer of data between user applications in each PID.

It should be noted that the IrDA stack is written for a single infrared point-to-point interface and not for an infrared-to-network-to-infrared interface. As a result, the timers and retransmission schemes implemented in view of the single infrared point-to-point interface may not function properly for the extended network interface.

Alternatively, IrDA stacks can be implemented in the phones as well. By implementing IrDA stacks in the phones, the timing of the infrared interface is unaffected by a network delay. Also, additional functions and features can be implemented in the phones. For example, the phones can implement challenge and authentication where the phone requires the user, through the PID, to enter a password or other information to authenticate an authorized user. Similarly, the PID may also be used to transmit commands to the phone and receive status information via the IrDA stack. The approach taken will depend upon the requirements of the design and the particular application.

6. Providing Messaging Services

Figure 6:
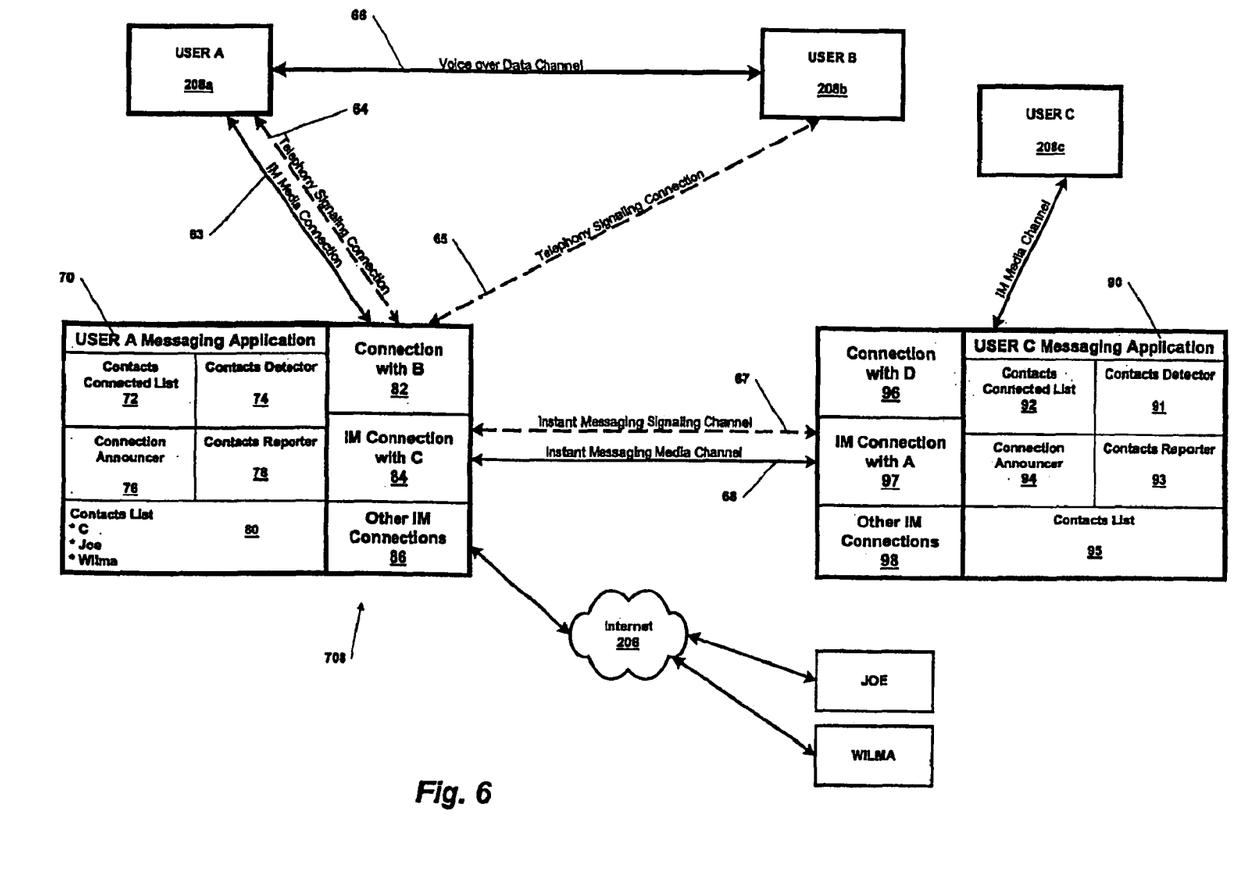
FIG. 6 is a block diagram illustrating an embodiment of a method for performing instant messaging in an exemplary embodiment of the present invention.

FIG. 6 is a functional block diagram illustrating exemplary embodiments of a system and method for performing messaging services. FIG. 6 includes examples of a messaging application 70 (and 90) according to one embodiment of the present invention. The User A messaging application 70 includes a contacts connected list 72, a contacts detector 74, a connection announcer 76, a contacts reporter 78, and a contacts list 80. The messaging application 70 may be implemented using computing resources accessible to the network telephony connection server 708, which may further include at any given time a connection with User B 82, an IM connection with User C 84 and other IM connections 86. The messaging application 70 may be preferably implemented as a SIP client in accordance with the SIP protocol.

The network telephony connection server 708 establishes a telephone connection with User B using a telephony signaling connection 64 and 65. The telephony signaling connections 64 and 65 are preferably connections formed in compliance with the SIP protocol where the network telephone connection server 708 performs as a proxy service. The connection with B 82 is preferably (but not limited to) a proxy SIP server. The telephony signaling connections 64 and 65 result in the formation of a voice over data channel 66 between User A and User B as described above with reference to FIG. 2. IN addition, an IM media connection 63 may be established between the proxy server 708 and the user 208a. The IM media connection 63 may be used to communicate messaging information. For example, the network telephony connection server 708 in FIG. 6 implements and controls both a signaling and a media connection for performing the messaging services such that all media and signaling data for messaging is routed through the server 708. The IM media connection 63 is therefore used to enable the user at User A 208a to use the messaging application.

The contacts connected list 72 includes a list of users from User A's contacts list that are connected to the data network 206. The contacts connected list 72 may be retrieved by the contacts detector 74. The contacts detector 74 senses whether the users identified in the contacts list 80 are connected to the data network. The contacts detector 74 may sense the presence of the users by sending SIP requests to the users. The SIP requests may contain queries for a status in accordance with a predetermined protocol for obtaining such information. Protocols for querying for connection information are known in the art. Alternatively, the contacts detector 74 may retrieve the status of the users in the contact list 80 by querying a central server that contains connection information for subscribers to the telephone service provider.

The contacts detector 74 may communicate the contacts available to the user (in the present context User A) using the contacts reporter 78 function over the IM media connection.

In addition to detecting whether users in User A's contact list 80 are connected, the connection announcer 76 may optionally, announce User A's availability for messaging due to its connection with User B 208b. The connection announcer 76 may announce A's availability by attempting a temporary data connection with each user in the contacts list 80. The connection announcer 76 and contacts detector 74 functions are optional. Each may be omitted or their functions may be combined such that the announcement and detection functions are accomplished simultaneously.

When the contacts detector 74 determines that a selected user (i.e. user listed in the contacts list 80) is connected, the user identifiers of the users that are connected to the data network 106, and thus available for messaging, may be communicated to the user via the contacts reporter 78. The messaging application 70 may present messaging services to the user using a messaging user interface (see 116 and 117 in FIG. 1).

The user may initiate a message to one of the users available by signaling an intent to communicate a message to the selected user. For example, User A may determine that users C, Joe and Wilma, which are users in its contact list 80, are available. User A signals an intent to send a message to User C by establishing a signaling channel 67 with User C. The signaling channel 67 is preferably established using the SIP protocol. Once the signaling channel 67 is established, a media channel 68 may be established between User A and User C to communicate messages. The server 708 implements the IM connection with User C 84 as a SIP client/server with a data communications channel to exchange messages between User A and C.

One advantage of the messaging application 70 in FIG. 6 is that the media channels 63 and 68 provide a connectivity path that is highly flexible in the manner in which media is communicated. For example, the media channels 63, 68 may include voice over data channels or data channels. Transcoding may be used to convert to different protocols depending on the facilities available in the server 708 and to the user.

The flexibility of the media channels 63 and 68 further provides for cross-platform implementations of messaging services, such that, for example, America Online (AOL) subscribers may send instant messages to Yahoo subscribers. Multiple messaging connections may also be established as shown by other IM connections 86 in the server 708.

FIG. 6 shows the User C messaging application 90 which includes a C's contacts connected list 92, a C's contacts detector 91, C's connection announcer 94, a C's contacts reporter 93 and a C's contacts list 95. As discussed, the User C messaging application 90 may be of the same or different implementation as that of the User A messaging application 70. The server 708 may implement different communications protocols in order to achieve cross-platform and different provider implementations. The signaling protocols may preferably be uniform and include the SIP protocol.

Figure 7:
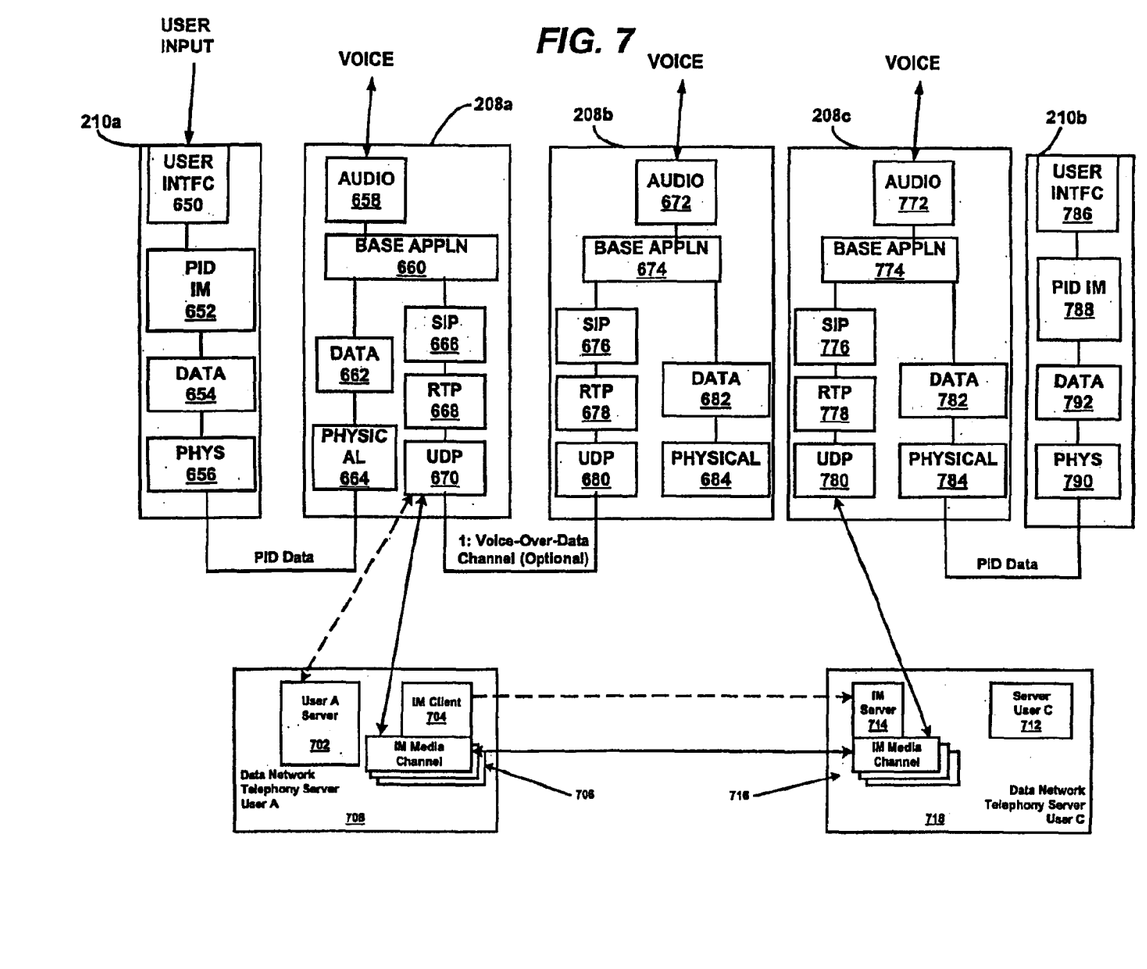
FIG. 7 is block and stack layer diagram illustrating an embodiment of the present invention in which messaging services are used during a telephone connection.

FIG. 7 is a functional block and protocol stack diagram illustrating an embodiment of the present invention where a telephone connection using a voice over data communications channel is established from the first data network phone 208a to the second data network phone 208a. The connection may be established via the User A server 702 in the data network telephony server 708 for user A. The User A server 702 implements the messaging application 70 as discussed in FIG. 6. As an example, User A establishes a messaging connection with User C, which is connected to another user via data network telephone 208c. User A to establish 1M media channel 706 for User A and IM media channel 716 for User C.

FIG. 7 illustrates an instant messaging example of the connections shown in FIG. 6 whereby the messages are communicated between User A and User C in accordance with SIP as the signaling protocol and an RTP/UDP data communications channel to communicate messaging media. FIG. 7 further illustrates the connections and protocols used between the data network telephone 208a and a PID 210a and between data network telephone 208c and PID 210b. The instant messaging user interface may thus be carried out on User A's and/or User C's PIDs 210a,c, respectively.

The PID IM application 652 in PID 210a is configured to send PID data as input, which in the present context is either a request to connect to User C, such as a hotlink on User C's user identifier, or text/image messages. The request is sent through the user interface 650 through to base application 660 in the first data network phone 208a. The base application 660 may also implement the application for performing a telephone call with User B (at data network telephone 208a). The data protocols 654 and 662 in the PID 210a and telephone 208a, respectively may include well-known data communications protocols used to communicate between a PID and a data network telephone 208a (See FIG. 5). In this embodiment, base application 660 is configured to define data channels for transporting messages to User C via data network telephone connection servers 708 and 718.

Multiple data channels in SIP may be defined through the Session Description Protocol described in RFC 2327, herein incorporated by reference. Included in a SIP INVITE request for a connection are options for the requested connection that describe the number and type of media streams. Each media stream is described by a "m=" line in the INVITE request. For example, a request for a connection that includes an audio stream and a bidirectional video stream using H.261 might look like this:

TABLE 1 v = 0
o = alice 2890844526 2890844526 IN IP4 host.anywhere.com
c = IN IP4 host.anywhere.com
m = audio 49170 RTP/AVP 0
a = rtpmap:0 PCMU/8000
m = video 51372 RTP/AVP 31
a = rtpmap:31 H261/90000

If the called device includes functionality to receive the connection as described in Table 1, then the called device will respond to the INVITE request with a 200 OK response that includes the same option values. If the called device or party is unable or unwilling to receive such a connection, then it will respond with alternative option values for the connection. See RFC 2543 for further details regarding the negotiation of connection parameters in SIP.

In FIG. 7, a first data channel for voice data has been negotiated by the base applications 660 in the first data network telephone 208a and the base application 674 in the second data network telephone 218a (User B). In addition, a second data channel for messaging data has been negotiated by the base application 660 in the first data network telephone 208a and the IM media channel 706 in the messaging application 70 of data network telephone connection server 708. The messages between User A and User C are communicated via base application 774 in the User C data network telephone 208c, then to the PID IM application 788 in User C's PID 210b. Meanwhile, the base applications 660 and 674 transfer voice data between the AUDIO applications, such as applications including G.711 encoders, in each phone via the first data channel.

While the invention has been described in conjunction with presently preferred embodiments of the invention, persons of skill in the art will appreciate that variations may be made without departure from the scope and spirit of the invention. For example, the access networks shown in FIG. 2 may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A system for communicating messages comprising:
   a data network to provide data connectivity for a plurality of data communications channels using data transport protocols;
   first, second and third data network telephones connected to the data network, each of the first, second and third data network telephones operable to communicate a voice signal as voice-over-data packets on a voice-over-data channel, the voice over data channel being one of the plurality of data communications channel on the data network, each data network telephone operable to convert voice-over-data packets communicated on the voice-over-data channel to voice signals;
   a messaging application connected to the data network, the messaging application adapted to detect a first voice over data channel between the first data network telephone and the second data network telephone, to establish a messaging media connection comprising a second data communications channel to the first data network telephone, to receive data messages from the third data network telephone and to send the data messages to the first data network telephone;
   a contact list comprising at least one contact user identifier, wherein the messaging application is adapted to establish a data channel to each of the at least one contact user identifier;
   a contacts detector to detect a data communications channel with the at least one of the contact user identifier; and
   a contacts reporter operable to communicate a report data message to the first telephone, the report data message comprising selected ones of the at least one contact user identifier with whom the first telephone may communicate messages.

2. The system of claim 1 wherein the messaging application is adaptable to detect a second voice over data channel to the third data network telephone and to send a contact user identifier to the first data network telephone.

3. The system of claim 1 wherein the messaging application is adapted to send a messaging input screen to the first data network telephone, the messaging input screen comprising a message input area and a contacts available list.

4. The system of claim 3 wherein the messaging application is adaptable to detect a second voice over data channel to the third data network telephone and to send a contact user identifier to the first data network telephone for display on the contacts available list.

5. The system of claim 1 wherein the messaging application is adapted to send a messaging report to each of the at least one contact user identifiers.

6. The system of claim 1 wherein the data messages comprise text-based messages.

7. The system of claim 1 wherein the data messages comprise voice-based messages.

8. A messaging application for communicating messages over a data network comprising:
   a connection detector adapted to detect a first voice over data channel between a first eelephone and a second telephone;
   a communications function operable to establish a messaging media connection with the telephone;
   a messaging function operable to communicate a messaging input screen to the first telephone and to communicate data messages with the first telephone;
   a contacts connected list comprising at least one contact user identifier;
   a contacts detector to detect a data communications channel with the at least one of the contact identifier; and
   a contacts reporter operable to communicate a report data message to the first telephone, the report data message comprising selected ones of the at least one contact user identifiers with whom the first telephone may communicate messages.

9. The messaging application of claim 8 further comprising a connection announcer operable to communicate a data message to at least one of the contact user identifiers, the data message operable to enable communications between the first telephone and the contact user identifiers.

10. The messaging application of claim 8 wherein the contacts connected list is operable to store connected contacts detected by the contacts detector.

11. The messaging application of claim 8 further comprising a connection to a telephony connection server comprising a telephone account for the first telephone, the connection operable to communicate a connection status to the messaging application.

12. A method for communicating messages over a data network comprising the steps of:
   detecting a voice over data communications channel between a first telephone and a second telephone;
   detecting a voice over data communications channel to a third telephone;
   sending a messaging input screen to the first telephone, the messaging input screen comprising a contact to the third telephone;
   sending a connection data message to the third telephone to report the availability of the first telephone for messaging;
   receiving a data message from the third telephone to the messaging application;
   sending the data message to the first telephone;
   receiving a data message at the messaging input screen;
   selecting the third telephone to receive the data message;
   communicating the data message to the messaging application; and
   communicating the data to the third telephone.

13. A method for communicating messages over a data network comprising the steps of:
   detecting a voice over data communications channel between a first telephone and a second telephone;
   detecting a voice over data communications channel to a third telephone;
   sending a messaging input screen to the first telephone, the messaging input screen comprising a contact to the third telephone;
   sending a connection data message to the third telephone;
   receiving a data message at the messaging input screen;
   selecting the third telephone to receive the data message;
   communicating the data message to the messaging application;
   communicating the data message to the third telephone;
   receiving a data message from the third telephone to the messaging application; and
   sending the data message to the first telephone.

* * * * *